(12) United States Patent
Rosenberg (10) Patent No.: US 11,164,477 B2
(45) Date of Patent: Nov. 2, 2021

(54) UTENSILS FOR THE PROMOTION OF MINDFUL CONSUMPTION

(71) Applicant: Julian Rosenberg, Fort Lee, NJ (US)

(72) Inventor: Julian Rosenberg, Fort Lee, NJ (US)

( * ) Notice: Subject to any disclaimer, the term of this patent is extended or adjusted under 35 U.S.C. 154(b) by 200 days.

(21) Appl. No.: 15/338,226

(22) Filed: Oct. 28, 2016

(65) Prior Publication Data

US 2018/0122264 A1     May 3, 2018

(51) Int. Cl.
*G09B 19/00*     (2006.01)
*G09B 5/00*     (2006.01)
*G08B 5/36*     (2006.01)

(52) U.S. Cl.
CPC ........... *G09B 19/0092* (2013.01); *G08B 5/36* (2013.01); *G09B 5/00* (2013.01)

(58) Field of Classification Search
CPC ............................ G09B 19/0092; G09B 19/00
USPC ........................................................ 434/127
See application file for complete search history.

(56) References Cited

U.S. PATENT DOCUMENTS 9,146,147 B1 * 9/2015 Bakhsh ................. A47G 21/02
2015/0024349 A1 * 1/2015 Bischoff ................ A47G 23/16
                                                         434/127

* cited by examiner

*Primary Examiner* — Timothy A Musselman
(74) *Attorney, Agent, or Firm* — Leason Ellis LLP (57) ABSTRACT

The present concerns systems, methods and computer program products for promoting the mindful consumption of a resource. A method for promoting the mindful consumption of a resource in accordance with one embodiment comprises interacting with a device to enter an initial state, receiving data indicative of a magnitude and direction of acceleration of the device and determining if the received data exceeds a threshold. If the received data exceeds the threshold, the device transitions to a secondary state, causing initiation of a timer. Upon expiration of the timer, the device transitions back to the initial state. According to one embodiment, transitioning from the initial state to the secondary state comprises darkening a first LED, e.g., a green LED, and illuminating a second LED, e.g., a red LED. Likewise transitioning from the secondary state to the initial state may comprise darkening the second LED and illuminating the first LED.

6 Claims, 6 Drawing Sheets

UTENSILS FOR THE PROMOTION OF MINDFUL CONSUMPTION

FIELD OF THE INVENTION

The invention described herein generally relates to systems, methods and computer program products for promoting the mindful consumption of resources, e.g., food, drink, video content, exercise, etc. In particular, the invention relates to systems, methods and computer program products provide feedback to a user, e.g., haptic, visual, audio, etc., to assist in controlling a rate at which the user consumes a resource. The invention further relates to systems, methods and computer program products to assist in controlling a rate at which the user consumes a resource that are contained within analogs of devices that the user typically associates with consumption of a given resource, e.g., a glass or cup for the consumption of liquids. Additionally, the invention relates to systems, methods and computer program products for managing the rates at which a user consumes various resources.

BACKGROUND OF THE INVENTION

Some in the medical profession believe that distracted consumption is one of the leading sources of unintended caloric intake and, therefore, uncontrolled weight gain among individuals living in modern, Western societies. Office workers and other busy individuals typically forego engaging in the ritual of a dedicated mealtime in favor of "multitasking", in which a person interleaves consumption of a meal in conjunction with the completion of other, unrelated tasks. For example, it is typical to observe an average American office worker consuming a meal while completing tasks at his or her desk. Oftentimes, individuals in such circumstances fail to appreciate or otherwise savor the act of consuming a meal, as well as the benefits that accompany such attentiveness. Indeed, a growing body of research suggests that a slower, more thoughtful way of eating could help in controlling weight problems, deterring people from the consumption of processed foods, and providing support for desired behaviors.

Such an approach to consumption, which has been coined "mindful eating", finds its basis in Eastern concepts of mindfulness that involve increasing or enhancing the level of awareness that an individual experiences within and around himself or herself at a given moment. Applied to eating, mindfulness includes connections between the act and the greater world including, but not limited to, colors, smells, flavors and textures of food, without distractions such as TV, reading or guilt associated with food consumption. When applied to subjects beyond the consumption of food or other resources, techniques that enhance mindfulness have been proposed as pathways to the relief of stress and attendant conditions such as high blood pressure and persistent gastrointestinal issues.

The act of digestion comprises the interplay of a complex set of signals between the digestive and nervous systems of the human body, with research indicating that it takes approximately twenty (20) minutes for the brain to register satiety. Where an individual consumes a meal too rapidly, he or she may experience the occurrence of satiety only after overeating, as opposed to the approach of such a condition signaling to the individual to stop eating. Similarly, there is anecdotal but strong evidence that distracted eating, such as when an individual is distracted by activities such as driving or typing, may slow down or stop digestion altogether in a manner that is similar to the effect of the "fight or flight" response on the body. Accordingly, a person may be failing to acquire the full benefit of the calories and nutrients he or she is consuming in view of improper digestion.

A number of studies indicate that mindful eating strategies might help individuals with managing a number of eating related disorders, as well as weight loss. For example, one recent NIH-funded study of mindful eating techniques for the treatment of binge eating observed 150 binge eaters, comparing mindfulness-based therapy with standard psychoeducational treatment and a control group. While each of the active treatments produced decline in binge eating and depression, the mindfulness-based therapy appears to help individuals in enjoying better their food and having minimizing struggles with respect to consumption control. Doctors believe that such therapies help individuals recognize differences between emotional and physical hunger, introducing a moment of choice between the urge and act of eating.

In addition to the use of mindfulness techniques to break bad habits or otherwise retrain people with respect to existing behaviors, such techniques are applicable to initial training as well. In these instances, mindfulness techniques are applied to certain situations to develop appropriate behavior in advance of the adoption of poor habits. For example, when attempting to train children to avoid the unnecessarily rapid consumption of food, a guardian or caregiver can apply mindfulness techniques to instill appropriate behaviors to obtain desired outcomes.

Accordingly, there is a need in the art for systems, methods and computer program products that provide cues rooted in mindfulness-based therapy that assist in controlling the rate at which an individual consumes a resource, e.g., the speed with which an individual eats a meal.

SUMMARY OF THE INVENTION

Embodiments of the invention are directed towards systems, methods and computer program products for promoting the mindful consumption of a resource, e.g., food. According to one embodiment, the invention comprises a method for promoting the mindful consumption of a resource. The method according to the present embodiment comprises interacting with a device upon the device entering an initial state, receiving data indicative of a magnitude and direction of acceleration of the device and determining if the received data exceeds a threshold. The device transitions to a secondary state if the received data exceeds the threshold.

Embodiments of the invention can deploy or utilize various mechanisms to indicate to the user a transition of the device from the initial state to the secondary state. For example, entering the initial state may comprise illuminating a first LED, which may be a green LED. Similarly, transitioning to the secondary state may comprise illuminating a second LED, which may be, for example, a red LED. The transition from an initial state to a secondary state may cause a timer to be set and initiated, which may be set by the device or a secondary device in communication with the device, the expiration of which causes the device to transition from the secondary state back to the initial state. According to one embodiment, transitioning from the secondary state back to the initial state comprises darkening the second (e.g., red) LED and illuminating the first (e.g., green) LED. The timer may be a variable timer that is set in accordance with user input, e.g., where the variable timer is a knob that is set to a specific countdown time based on user input, such as turning the knob to a specific time, which thereby provides an input to the timer as to the countdown time length. Digital input controls and other input mechanisms suitable for providing a countdown time length that are known to those of ordinary skill in the art also fall within the scope of various embodiments of the invention.

An accelerometer provides for the receipt of data indicative of a magnitude and direction of acceleration. Based on such data that the accelerometer generates, embodiments of the methodology continue by determining if the received data exceeds a threshold. Determining if the received data exceeds a threshold can comprise comparing the received data with stored motion curve data to determine a match. Alternatively, or in conjunction with the foregoing, determining comprises determining if the received data indicates a horizontal abduction of the device, e.g., rapidly moving away from a highest point of vertical movement of the device. The method can comprise maintaining the device in the initial state if the received data fails to exceed the threshold.

In addition to the above-described method, embodiments of the invention are also directed towards non-transitory computer readable media comprising program code that when executed by a programmable processor causes execution of a method for promoting the mindful consumption of a resource with a device. According to one embodiment of the present invention, such program code comprises program code to enter an initial state when interacting with the device, program code for receiving data indicative of a magnitude and direction of acceleration of the device, program code for determining if the received data exceeds a threshold and program code for transitioning the device to a secondary state if the received data exceeds the threshold.

The program code for entering the initial state can comprise program code for illuminating a first LED, which can further comprise program code for illuminating a green LED. Similarly, the program code for transitioning to the secondary state can comprise program code for illuminating a second LED, which can further comprise program code for illuminating a red LED. In addition, various embodiments implement program code for setting and initiating a timer, as well as program code for transitioning from the secondary state back to the initial state upon expiration of the timer.

Beyond the above-described method and computer program products, embodiments of both which are described in greater detail herein, embodiments of the invention are directed towards an apparatus for promoting the mindful consumption of a resource. The apparatus according to one embodiment comprises a body configured to house an accelerometer operative to generate data indicative of a magnitude and direction of acceleration of the body. The body is further configured to house a first LED, the illumination of which indicates that the apparatus is in an initial state, and a second LED, the illumination of which indicates that the apparatus is in a secondary state.

Further housed within the body is a programmable microprocessor operative to execute program code that instructs the programmable microprocessor to receive the data generated by the accelerometer and compare the received data against a threshold to illuminate the second LED and darken the first LED when the comparison indicates that the received data exceeds the threshold. The apparatus can further implement a timer that is set in conjunction with the illumination of the second LED, the expiration of which instructs the programmable microprocessor to illuminate the first LED and darken the second LED.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Throughout the specification and claims, terms may have nuanced meanings suggested or implied in context beyond an explicitly stated meaning. Likewise, the phrase "in one implementation" or "in one embodiment" as used herein does not necessarily refer to the same implementation or embodiment and the phrase "in another implementation" or "in another embodiment" as used herein does not necessarily refer to a different implementation or embodiment. Similarly, the phrase "one or more implementations" or "one or more embodiments" as used herein does not necessarily refer to the same implementation or embodiment and the phrase "at least one implementation" or "at least one embodiment" as used herein does not necessarily refer to a different implementation or embodiment. The intention is, for example, that claimed subject matter include combinations of example implementations and embodiments in whole or in part.

One or more embodiments provide utensils that provide feedback to a user to guide him or her in the consumption of an item, such as food or drink, such feedback taking in one embodiment the form of visual signals. Accordingly, the utensil encourages the user to consume when the utensil is in a first state and encourages the user to refrain from consumption when in a second state. When using the utensil in an initial first state, an accelerometer provides a microprocessor with data indicative of a magnitude and direction of the acceleration of the utensil as a vector quantity. Such data points, when measured over a given window of time, form a "motion curve" that may be indicative of completion of a given action, e.g., raising a fork to the mouth in order to take a bite of food. The microprocessor continually receives output data from the accelerometer for comparison against one or more motion curves that a storage device maintains, which may comprise local storage, remote storage or various combinations thereof. If the microprocessor determines by way of one or more calculations that the motion curve data from the accelerometer matches a stored motion curve, the microprocessor switches the device from the first state to a second state. After a period of time elapses, which may be a set time period or a variable time period, e.g., set by the user of the device, the utensil switches back from the second state to the first sate.

While this application refers to an "accelerometer" as the device for providing data indicative of the magnitude and direction of the utensil, the present application does not intend to be limited to only accelerometers for this feature. More broadly, one of ordinary skill recognizes that utensil motion data can be captured by a variety of motion sensing devices. For example, one or more gyroscopic sensors, force sensors, MEMS sensors and the like can be used in conjunction with or in place of an accelerometer to provide utensil motion data.

Figure 1A:
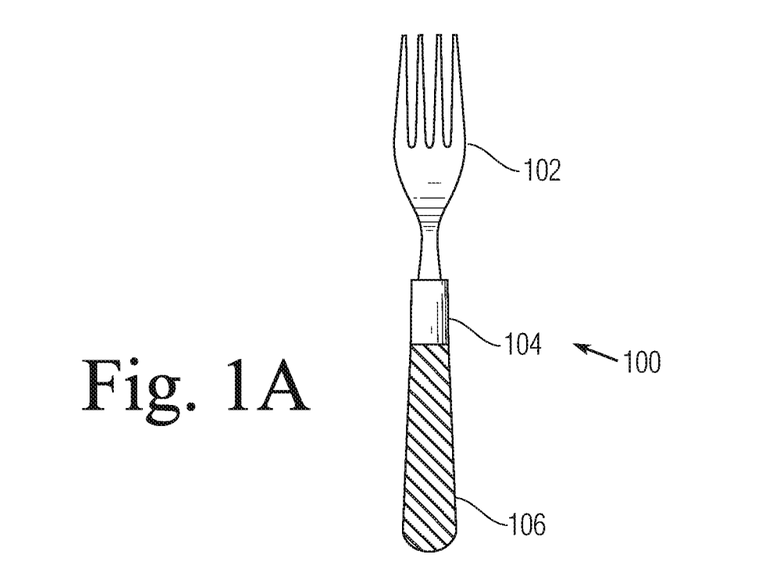
FIG. 1A presents an image of a utensil that is operative to control a rate at which a user consumes a resource in a first state according to one or more embodiments of the present invention.
Figure 1B:
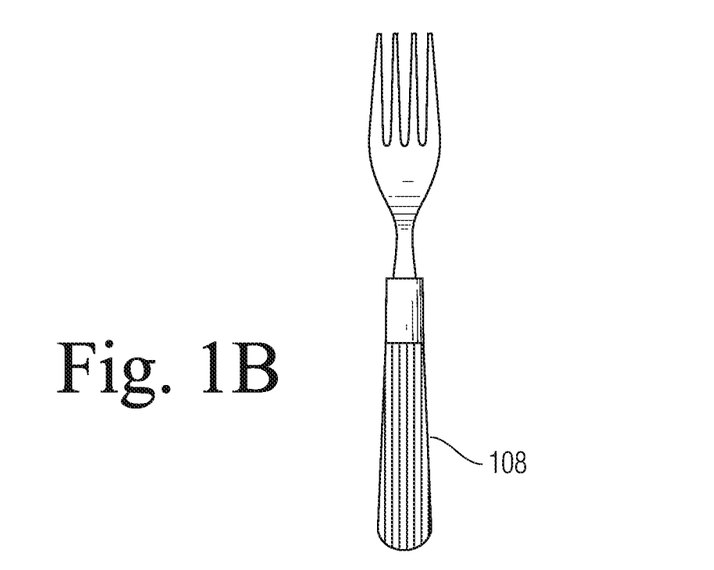
FIG. 1B presents an image of the utensil that is operative to control a rate at which a user consumes a resource in a second state according to one or more embodiments of the present invention.

FIG. 1 illustrates one embodiment in which the invention comprises a fork 100 that provides feedback to a user to guide him or her in the consumption of food, such guidance taking the form of a plurality of visual signals. In accordance with the embodiment of FIG. 1, the fork 100 comprises a traditional head end that includes a plurality of tines 102 for use in collecting food items for consumption. Inside a sealed or semi-sealed section within the body of the fork 100 is a structure 104 to house electronics (not pictured) that control the provision of visual signals that indicate transition from a first state (e.g., consume) to a second state (e.g., refrain from consumption). Visual signals are set in response to output that a microprocessor receives from an accelerometer, both of which may be housed inside the structure 104.

The use of visual signals to indicate state change in the present embodiment takes the form of transitioning an LED, which may be contained within the structure 104, to illuminate a handle of the fork from the display of a first color 106 to the display of a second color 108. Accordingly, when the LED in the initial state illuminates the handle of the fork 100 to appear a first color 106 (e.g., green), the user may consume using the utensil. When the LED transitions to the second state 108, such that the handle of the fork appears to be red, the user is aware of the need to refrain from consumption using the utensil. After a period of time elapses, the LEDs in the fork 100 transition from the second state 108 back to the initial state 106, which in accordance with an exemplary embodiment would result in the illumination of the handle of the fork transitioning from red 108 back to green 106.

Although the embodiment of FIG. 1 illustrates the device as a fork, those of skill in the art should recognize that the invention is not limited to such an embodiment. As is explained in detail herein, the electronics in the utensil or device, which in the present embodiment is a fork, track the use of the utensil or device in 3D space. Such movement of a utensil or device is referred to herein as a "motion curve". The electronics are operative to fit such motion curve data representing the use of the fork against one or more sets of stored motion curve data that represent completion of an action with the utensil or device.

Continuing with the example of a fork 100, the use of a fork to eat an item of food comprises the act of moving the fork through 3D space to bring the food up to the mouth for consumption. After consumption, the fork moves through 3D space away from the mouth subsequent to completion of consumption of the item on the fork, e.g., a motion curve representing use of the fork. Electronics on the device store one or more motion curves representing movement of the device through 3D space to consume a bite of food, which the electronics compare against the motion curve data generated by use of the device. When the curves match, e.g., the user has used the fork to take a bite of food, the device transitions from the first state to a second state. Various embodiments can utilize only a portion of the stored motion curve data to fit against motion curve data received from the device, e.g., only the portion of stored motion curve data indicating the path of the device subsequent to taking a bite.

Many utensils and devices have uses that may be identified by a general motion curve (and tolerated deviation therefrom). Similar to a fork, the use of a spoon has a motion curve that identifies a successful use of the device, e.g., a person has used the spoon to consume a bit of food. A cup or glass also has a motion curve that defines a path of movement of the utensil through 3D space that is indicative of successful use of the device, e.g., the individual has taken a sip of liquid from the cup or glass.

Building on this point, a number of other devices may incorporate the core principles of the invention including, but not limited to, a smart tracking device for exercise. Such a device is programmed with one or more motion curves for a set of exercise movements, monitoring the movement of the body of an individual through 3D space and providing feedback when recognizing completion of a rep (or set) of a given exercise movement. Rep or set completion may trigger transition from a first state to a second state, during which the user holds the form until the transition back to the first or initial state. Similar techniques would be further applicable to yoga, baseball, tennis, other athletics or any activity having a movement, the inception and completion of which can be tracked in 3D space.

Figure 2:
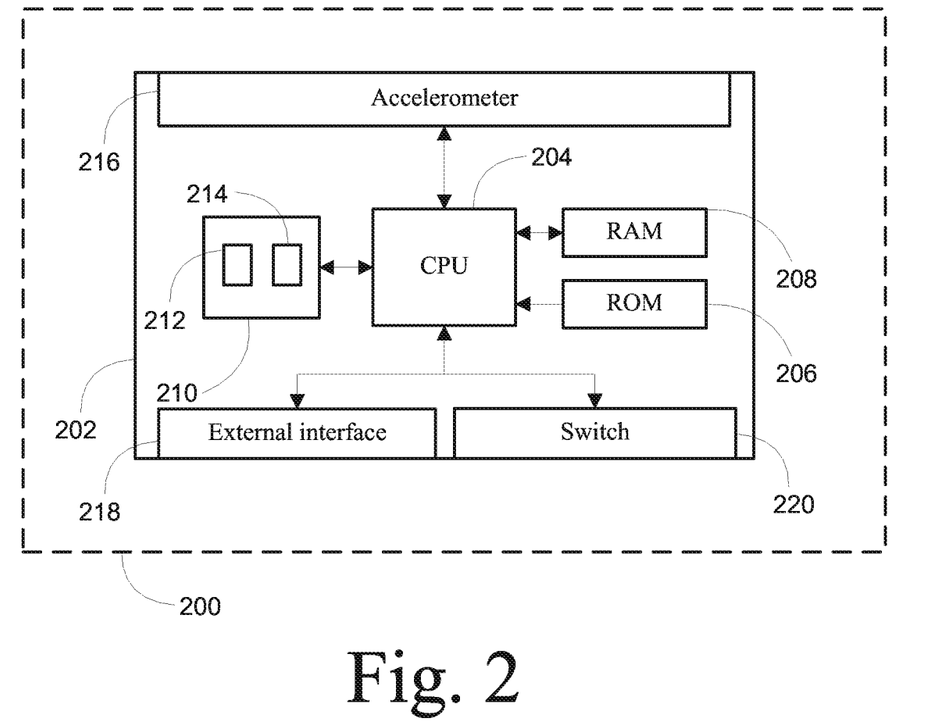
FIG. 2 presents a block diagram illustrating hardware and software components to control the rate at which a user consumes a resource according to one or more embodiments of the present invention.

FIG. 2 presents a block diagram illustrating hardware and software components for promoting the mindful consumption of resources by controlling a rate at which the user consumes such resources. Exemplary hardware and software components may be housed within the body of a utensil or device 200 so that it unobtrusively forms a part of the overall apparatus. Certain physical interfaces may be accessible on or through the body 200 of the utensil or device, such as external interface 218 and switch 220, which may further comprise additional physical interfaces beyond those depicted in the present embodiment. External interface 218 may be any suitable physical interface that allows for interconnection between the electronics 202 and a power or data source. For example, external interface 218 may be a USB or Lightning connection interface that provides current to an internal battery (not pictured) and a data connection to other processing components. Other processing components in accordance with various embodiments allow for the download of recorded data and upload of new or updated stored motion curve data representing movement of the utensil through 3D space that is indicative of successful use of the device.

The switch 220 provides a mechanism to power down the electronics 202 when the device 200 is not in use. Alternative embodiments forego the switch in favor of programming the microprocessor to shut down the electronics 202 after failing to receive data from the accelerometer for a specific period of time, e.g., the electronics power down after the microprocessor fails to receive data from the accelerometer for a period of five (5) minutes. Switch 220 may further comprise a mechanism that allows the user to set the interval over which the device transitions from the second state back to the initial state. According to one embodiment, the microprocessor 204 executes program code that allows for the recognition of various click patterns that the user can engage in with the switch, a given one of the various click patterns setting a particular state change transition interval. For example, three clicks set the transition interval to five (5) seconds, whereas four clicks set the transition interval to ten (10) seconds. Those of skill in the art recognize that alternative click patters and transition intervals fall within the scope of the invention, and that other suitable physical interfaces are known for use in setting such transition intervals, e.g., a wheel or dial.

Beyond the external interface 218 and switch 220, the user of the device 200 interfaces with the electronics through normal use, e.g., using a cup to drink a beverage. Such normal use allows for interaction with the electronics 202 due to the accelerometer 216 recording such use as data indicative of a magnitude and direction of the acceleration of the utensil through 3D space, which may comprise receiving such data as a vector quantity or quantities, which the accelerometer provides as input to the microprocessor 204. Such data provides the microprocessor 204 with a representation of the movement of the device 200 through 3D space as a function of time.

The microprocessor 204 executes or otherwise runs program code that the electronics 202 maintains on RAM 208 and ROM 206 memory structures. The ROM 206 memory structure is a non-volatile memory used to store firmware that runs the electronics 202. In one embodiment, the ROM 206 is a mask ROM ("MROM") that is not suitable for modification subsequent to manufacture. According to alternative embodiments, the ROM 206 is any memory structure that is read-only in normal operation, but remains reprogrammable, such as an erasable programmable read-only memory ("EPROM") or an electrically erasable programmable read-only memory ("EERPOM"). The use of such non-volatile memory for storage of the firmware is a result of the infrequency with which such data requires updating. The RAM 208 memory structure, by contrast, is a volatile memory such as a SRAM or DRAM memory cells, which the microprocessor 204 uses to store executing program code that the microprocessor 204 reads from ROM 206, transient data values, incoming data from the accelerometer, state information or any other volatile data.

The microprocessor 204 is also in communication with a state indication assembly 210, which in the present embodiment comprises two state indicators 212 and 214. The state assembly 210 comprises any suitable printed circuit board and associated electrical components that support a given state indicator. According to the embodiment of FIG. 2, the state assembly 210 is a PCB that supports two LEDs: one representing a first state 212, such as a green LED, and a second one representing a second state 214, such as a red LED. The microprocessor, under control of program code loaded from combinations of ROM 206 and RAM 208, selectively energizes or illuminates the LEDs 212 and 214 to communicate to the user whether the device is in the first state or the second state.

In one or more alternative embodiments, the state indicators 212 and 214 may be represented by a single LED. For example, the single LED can be a RGB LED having a common cathode that upon receiving a particular state indication, can display a particular color (e.g., a RGB LED can display red, green, blue, cyan, magenta, and yellow). The single LED can transition between state indicator 212 and state indicator 214 by displaying different colors at the single LED if the state assembly 210 indicates a change in state.

Starting from power up, which may be initiated by the user selectively actuating the switch 220, the microprocessor 204 initializes and initiates communication with the ROM 206. The microprocessor 204 read instructions from ROM 206, in the form of program code, which may be binary or object code, microcode, scripting code or other program code that the microprocessor 204 may execute, run or interpret, and sets the device to its initial state. The initial state is embodiment specific and, in the present embodiment takes the form of energizing the initial state LED 212 on the state assembly 210 to illuminate such LED 212.

The accelerometer 216 also initializes and begins collecting data indicative of a magnitude and direction of acceleration of the device 200. The accelerometer feeds such data as input to the microprocessor 204, which evaluates the data against one or more stored motion curves that the microprocessor 204 reads from ROM 206 and maintains in RAM 208 during processing. According to one embodiment, the program code read from ROM 206 instructs the microprocessor 204 to evaluate incoming data from the accelerometer 216 to identify a sequential set of data points that reads onto or otherwise aligns with a stored motion curve, which the microprocessor 204 may also load from ROM 206 and maintain in RAM 208. Those of skill in the art recognize that the stored motion curve data may comprise a sequential set of data points that represent a successful use of the device to which the stored motion curve applies. For example, the stored motion curve data may comprise data points representing the relative movement of a device away from the mouth of a user when the device is a fork or spoon.

When the microprocessor 204 identifies a match with stored motion curve data that has been loaded into RAM 208, the microprocessor 204 sends a signal to the state assembly 210 instructing that the initial state LED de-energize and go dark, while the second state LED is to energize and illuminate. Accordingly, the user receives an indication that the device 200 is in its second state and that consumption should pause. For example, assuming that the device 200 is a fork such as the one depicted in FIGS. 1 and 1A, the stored motion curve data that the processor loads into RAM is a mathematical model that represents the path of a fork from a zero position on the plate to the x-y-z coordinate at the mouth of the user.

Although the spatial coordinates for the mouth of any given individual in relation to the plate are different, the path that the fork follows from plate to mouth is a generally well-defined path. Alternatively, the stored motion curve data may comprise a mathematical model that represents the path of a fork from a zero position at the mouth of the user and the x-y-z coordinates of the fork as it travels away from the mouth of the user subsequent to taking a bite. In either event, the program code provides an allowance for some degree of variation from the stored motion curve data that the microprocessor loads into memory for comparison analysis. In one or more embodiments, the degree of variation from the stored motion curve data can be configured to vary depending on the user. For example, the degree in variation of motion curve for a child may be greater than that of an adult. According to some embodiments, the program code configures the microprocessor to implement a fuzzy logic system that allows for a state transition if the incoming motion data from the accelerometer indicates that it is overall more probable than not that the set of data matches a given stored motion curve.

In conjunction with the state change, the program code instructs the microprocessor to set a clock that counts down a time interval. According to one embodiment, the time interval that the countdown clock measures is a fixed value set in program code written to ROM. Alternatively, the time interval that the countdown clock measures is a user set value, which may be variably set, e.g., by interacting with the switch 220 to enter one of a plurality of click patters that the microprocessor 204 acts upon in accordance with the program code that it is running. Those of skill in the art recognize that such a time interval may be set by other physical interface input controls, such as a dial, wheel or knob. Upon expiration of the time interval, the microprocessor 204 sends a signal to the state assembly 210 instructing that the secondary state LED de-energize and go dark, while the initial state LED is to energize and illuminate. Such state transition from the secondary state back to the initial state indicates to the user that it is appropriate for consumption to resume.

Figure 3A:
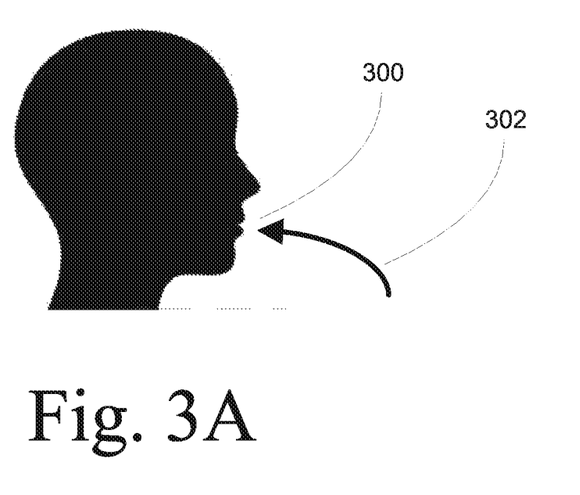
FIG. 3A presents an illustration depicting the path of a utensil that is operative to control a rate at which a user consumes a resource in a first state according to one or more embodiments of the present invention.
Figure 3B:
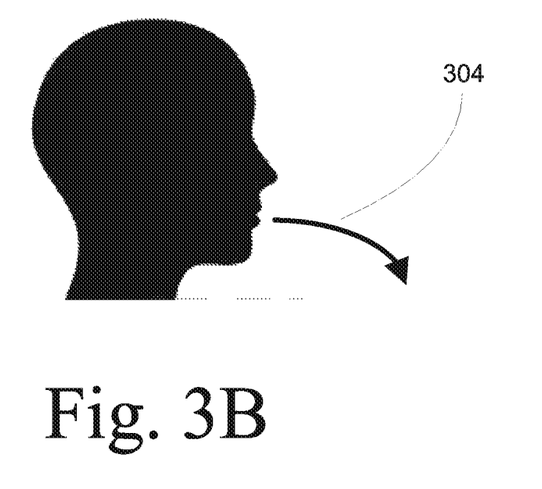
FIG. 3B presents an illustration depicting the path of a utensil that is operative to control a rate at which a user consumes a resource transitioning to a second state according to one or more embodiments of the present invention.

FIGS. 3A and 3B depict this state relationship by illustrating the exemplary path of the device in use. When the user initially interacts with the device, e.g., at a time when the device powers up, the device is in its initial state. As discussed above, the device loads stored motion curve data and begins to receive data from its accelerometer indicating movement of the device through 3D space. The microprocessor in accordance with the embodiment of FIG. 3A continually receives motion data from the accelerometer and looks to match incoming motion data from the accelerometer with stored motion curve data indicating that the user has moved the device in 3D space towards his or her mouth 300, thereby indicating that the bite has successfully been taken. In response to such a match, the microprocessor transitions the device from its initial state to a secondary state, thereby indicating to the user that he or she should temporarily refrain from further consumption.

Other embodiments view different movements of the device to determine that there is a match with stored motion curve data and, therefore, that the user has successfully utilized the device. For example, the microprocessor in accordance with the embodiment of FIG. 3B continually receives motion data from the accelerometer and looks to match incoming motion data from the accelerometer with stored motion curve data indicating that the user has moved the device in 3D space away from his or her mouth 304. The generation or receipt of such motion data indicates that he or she has successfully taken a bite. In response to such a match, the microprocessor transitions the device from its initial state to a secondary state, thereby indicating to the user that he or she should temporarily refrain from further consumption.

Figure 4:
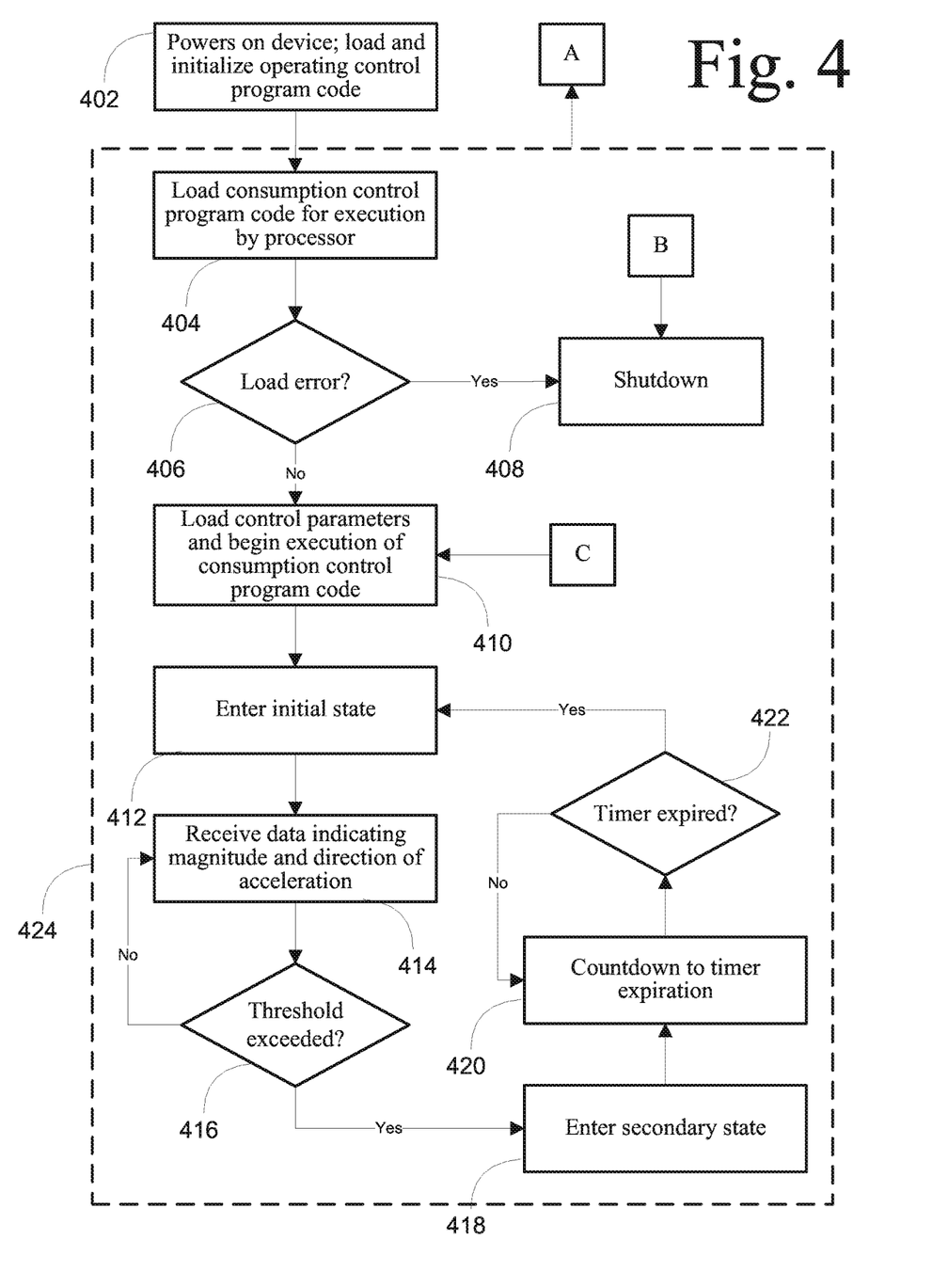
FIG. 4 presents a flow diagram illustrating a method for controlling a rate at which a user consumes a resource according to one or more embodiments of the present invention.

FIG. 4 presents a flow diagram illustrating a method for controlling a rate at which a user consumes a resource according to one or more embodiments of the present invention. Encouraging mindfulness by controlling the rate at which a user consumes a resource leads to a number of above-described health benefits. The method of FIG. 4 begins with the device powering on, step 402, as well as performing a load an initialization of an operating system or other low level GIPO program code to control device state. Program flow passes to a primary process, step 424, which handles state control that accompanies normal use of the device, which begins with the microprocessor loading the consumption control program code that is responsible for state control based on device use, as well as responding to user input from any physical interfaces that might be present, step 404.

The program code instructs the microprocessor to perform a check to determine if there was any error encountered in loading the consumption control program code, step 406. Where a load error is encountered and the microprocessor is unsuccessful in loading such program code to run, the device enters a shutdown state, step 408, which may also comprise the device reporting diagnostic or error code information, e.g., by various flash patters in which the LEDs can engage to convey error status information. Where the microprocessor does not encounter any load errors, step 406, the microprocessor loads any control parameters that might be necessary for proper operation and begins execution of the consumption control program code, step 410. Those of skill in the art recognize that although use of the term "execute" is with respect to the consumption control program code, such terminology is not meant to suggest or otherwise imply that such program code must be in a compiled state. Indeed, the scope of the invention is broad enough to cover all forms of program code, including scripting code and other types of partially compiled or non-complied program code.

Upon completion of loading operating system program code, step 402, consumption control program code, step 404, and loading any parameters or initialization data, step 410, the device enters its initial state, step 412. As described above, the manner in which a given device conveys its initial state is highly device dependent. For example, turning to the exemplary embodiment incorporated within a fork, the initial state as illustrated by FIG. 1A is to illuminate the handle of the fork with a green LED. Similarly, a spoon or cup in an initial state may also illuminate a first LED, such as a green LED, to indicate that the device is in its initial state. Other manners of conveying state information also fall within the scope of the invention, e.g., using audio feedback or providing state information through haptic feedback whereby a motor vibrates the device for a certain duration of time or in accordance with a given vibration pattern to indicate state.

Upon initialization and entry into an initial state, step 412, the microprocessor receives data indicative of a magnitude and direction of acceleration through its interface with the accelerometer, step 414. The accelerometer derives such values in response to normal use of the device by the user, e.g., using the device to bring food to the mouth where the device is a fork. The microprocessor continually evaluates the data that it receives from the accelerometer, step 416, comparing such data to various thresholds set in the program code. For example, the thresholds can be configured in accordance with motion curve data and can include deviation tolerance. In this way, the microprocessor can process whether the received accelerometer data indicates consumption. Where the microprocessor determines that the data it is receiving from the accelerometer does not exceed or surpass the thresholds set in the program code, program flow returns to step 414 with the microprocessor continuing to receive data from the accelerometer that indicates the magnitude and direction of the acceleration of the device.

Where the microprocessor determines that the data it is receiving from the accelerometer exceeds or surpasses the thresholds set in the program code, step 416, the device switches from its initial state (set in step 412) to a secondary state, step 418. As described above, the manner in which a given device conveys entry or transition into a secondary state is highly device dependent. For example, turning to the exemplary embodiment incorporated within a fork, the secondary state as illustrated by FIG. 1B is to illuminate the handle of the fork with a red LED. Similarly, a spoon or cup in a secondary state may also illuminate a second LED, such as a red LED, to indicate that the device is in its initial state. Other manners of conveying secondary state information also fall within the scope of the invention, e.g., using audio feedback or providing secondary state information through haptic feedback whereby a motor vibrates the device for a certain duration of time or in accordance with a given vibration pattern to indicate that it is in its secondary state. When entering the secondary state, the device communicates to the user to pause consumption of the resource that he or she is consuming through use of the device.

In conjunction with transition into the secondary state, step 418, the microprocessor initializes and starts a countdown clock, step 420. The countdown clock or timer can take any one of a number of forms that are well known to those of skill in the art. For example, the countdown clock or timer can be a soft-timer that is implemented in program code that the microprocessor is running or executing, a dedicated clock circuit, an interface with an external clock through a network or other external interface, etc.

The program code instructs the microprocessor to perform a check to check for expiration of the countdown timer, step 422. Alternatively, program flow can hold until the microprocessor receives an indication that the timer has elapsed or otherwise expired. When the timer expires, step 422, the device transitions from the secondary state back to the initial state, step 412. At this point, the microprocessor continues to receive data indicating magnitude and direction of acceleration, step 414, as well as analyzing such data to determine when transition to the secondary state is necessary, step 416.

Figure 5:
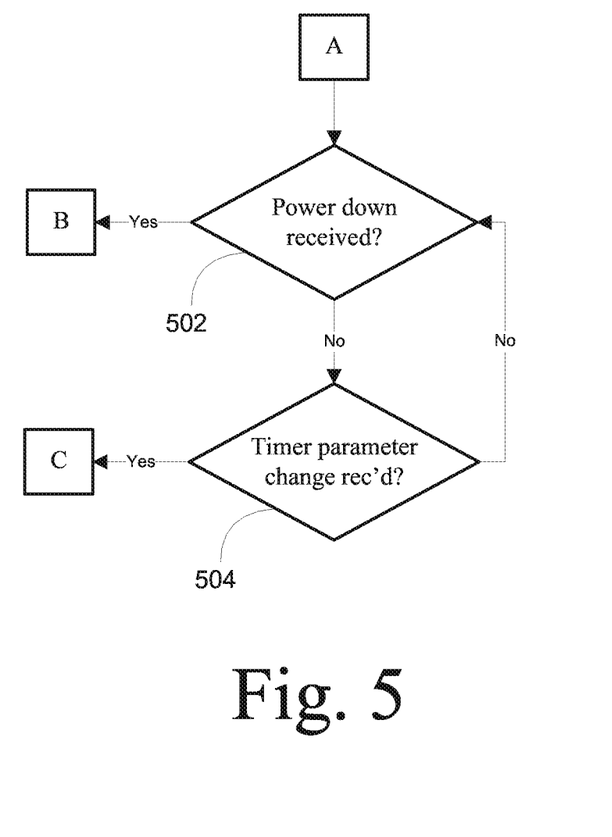
FIG. 5 presents a flow diagram illustrating an out of line process for providing input to the process of FIG. 4 according to one or more embodiments of the present invention.

As indicated above, program flow that FIG. 4 illustrates comprises a primary process 424 that handles state control accompanying normal use of the device. Taking place in parallel with the primary process is the out of line process of FIG. 5. According to one embodiment, the process of FIG. 5 implements such checks in software as "listeners" such that when the microprocessor receives a signal from a physical interface, program code running at the microprocessor instructs the microprocessor as to the proper action to be taken in response to the receipt of such a signal.

Program control initially flows into a first check that evaluates for receipt of a power down signal, step 502, which the microprocessor can receive as a high-voltage signal from a physical interface, e.g., a pushbutton switch. Where the check evaluates to true and indicates receipt of a power-down signal, step 502, program flow returns to FIG. 4 with the device entering a shutdown state, step 408. Where the check evaluates to false, step 502, the microprocessor performs a subsequent check for the receipt of any time parameter changes, step 504, e.g., the amount of time that elapses before the device reverts from the secondary state back to the primary state. Where there is a time parameter change, program flow returns to FIG. 5 with the device loading such time parameter changes as control parameters to the consumption control program code, step 410. Where the checks both evaluate to false, program flow continues to loop until one of the checks evaluates to true.

Figure 6:
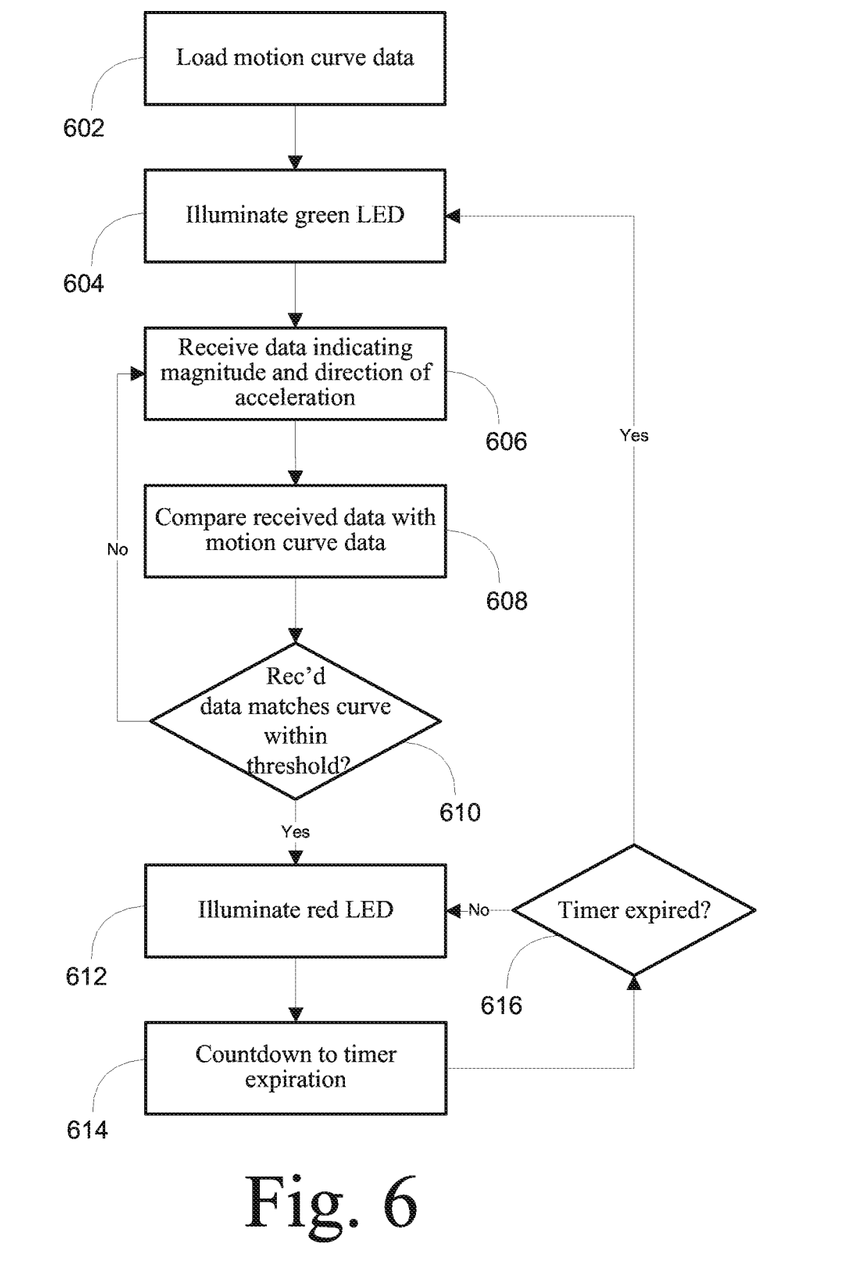
FIG. 6 presents a flow diagram illustrating another method for controlling a rate at which a user consumes a resource according to an alternative embodiment of the present invention.

FIG. 6 presents a flow diagram illustrating another method for controlling a rate at which a user consumes a resource according to an alternative embodiment of the present invention. The program flow of FIG. 6 represents an alternative embodiment to the primary process of FIG. 4 and can optionally execute in conjunction with the out-of-process program flow of FIG. 5. The process of FIG. 6 begins with a microprocessor accessing a storage device, e.g., RAM, ROM, flash or other memory or storage device types, to retrieve and load motion curve data, step 602. A motion curve data represents the motion of an object through 3D space and is indicative of completion of a given action, e.g., raising a fork to the mouth in order to take a bite of food. Accordingly, the microprocessor loads a motion curve that is specific mathematical representation of the motion of the device through 3D space in completion of an intended task.

The program code instructs the microprocessor to load one or more stored motion curves or sets of stored motion curve data and enter an initial state, which according to the embodiment of FIG. 6 comprises illuminating a green LED, step 604, which visually communicates to the user that the device is in its initial state. Once in the initial state, the microprocessor is operative to receive data indicating a magnitude and direction of acceleration of the device, step 606, which may comprise receiving such data from the accelerometer as a set of one or more vector values. According to various embodiments, the microprocessor receives such data from the accelerometer over a period or window of time.

As the microprocessor receives data from the accelerometer, step 606, the microprocessor performs a comparison between such incoming data and the stored motion curve data that the microprocessor loads from a persistent memory source, such as RAM or ROM, which may be located local or remote to the microprocessor, step 608. Where the microprocessor determines that there is a match, step 610, between the data that it is receiving from the accelerometer and the stored motion curve data previously loaded, step 602, program flow is directed towards step 612 with the illumination of a red LED indicating that the device is in the secondary state. The microprocessor determines a match, step 610, by comparing the data received from the accelerometer with all of or a portion of the stored motion curve data that it loads into memory. For example, such comparison may entail matching the received data with the portion of the stored motion curve data indicating that the device is moving away from the mouth of the user such as set forth in FIG. 3B.

Upon entering the secondary state as indicated by illumination of the red LED, step 612, a countdown to timer expiration begins, e.g., a timer is set and begins countdown, step 614. The microprocessor performs a check to determine if the timer has expired, step 616, and maintains illumination of the red LED 612 until expiration of the timer. When the timer expires, step 616, the device returns to the initial state by illuminating the green LED, step 604, with the microprocessor continuing to receive data indicating the magnitude and direction of the device, step 606, as well as comparing such data to the stored motion curve data, step 608.

Accordingly, the device begins in an initial state and cycles to the secondary state upon the user moving the device in a manner that matches or approximates the stored motion curve data. The device then waits a proscribed amount of time before cycling back to the initial state. As such, the device is operative to instruct the user as to when the device is suitable to use for consumption of a resource, e.g., when in the initial state, which may be indicated by illumination of a green LED, and when the user should wait and refrain from consumption, e.g., when in the secondary state, which may be indicated by illumination of a red LED.

FIGS. 1 through 6 are conceptual illustrations allowing for an explanation of the present invention. Those of skill in the art should understand that various aspects of the implementations of the present invention could be implemented in hardware, firmware, software, or combinations thereof. In such implementations, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary implementations, but should be defined only in accordance with the following claims and their equivalents.

What is claimed is:

1. An apparatus for promoting the mindful consumption of resources, the apparatus comprising a body configured to house:
    an accelerometer to generate data indicative of a magnitude and direction of acceleration of the body;
    a first LED, the illumination of which causes the body to be illuminated in a first color that indicates the apparatus is in an initial state to instruct a user that he or she may use the apparatus to consume resources;
    a second LED, the illumination of which causes the body to be illuminated in a second color that indicates the apparatus is in a secondary state to instruct the user that he or she may not use the apparatus to consume resources;
    electronic storage to maintain motion curve data that represents movement of the body through 3D space when consuming a resource;
    a programmable microprocessor operative to execute program code that instructs the programmable microprocessor to enter an initial state, receive the data generated by the accelerometer over a time window for comparison against the motion curve data to determine if a threshold to illuminate the second LED and darken the first LED is exceeded through the use of a fuzzy logic system that allows for a state transition if it is more probable than not that the received data matches the motion curve data, and illuminate the second LED and darken the first LED when the threshold is exceeded; and
    a variable timer that begins to count down when the threshold is exceed and illuminates the first LED and darkens the second LED when the timer expires.

2. The apparatus of claim 1 wherein the first LED comprises a green LED.

3. The apparatus of claim 1 wherein the second LED comprises a red LED.

4. The apparatus of claim 1 wherein the timer is a variable timer.

5. The apparatus of claim 4 wherein the variable timer is set in accordance with user input.

6. The apparatus of claim 1 wherein the program code instructs the programmable microprocessor to continue to illuminate the first LED when the threshold is not exceeded.

* * * * *